J. SMITH.
FRUIT PRESS.
APPLICATION FILED NOV. 7, 1912.
1,077,437.
Patented Nov. 4, 1913.
2 SHEETS—SHEET 1.
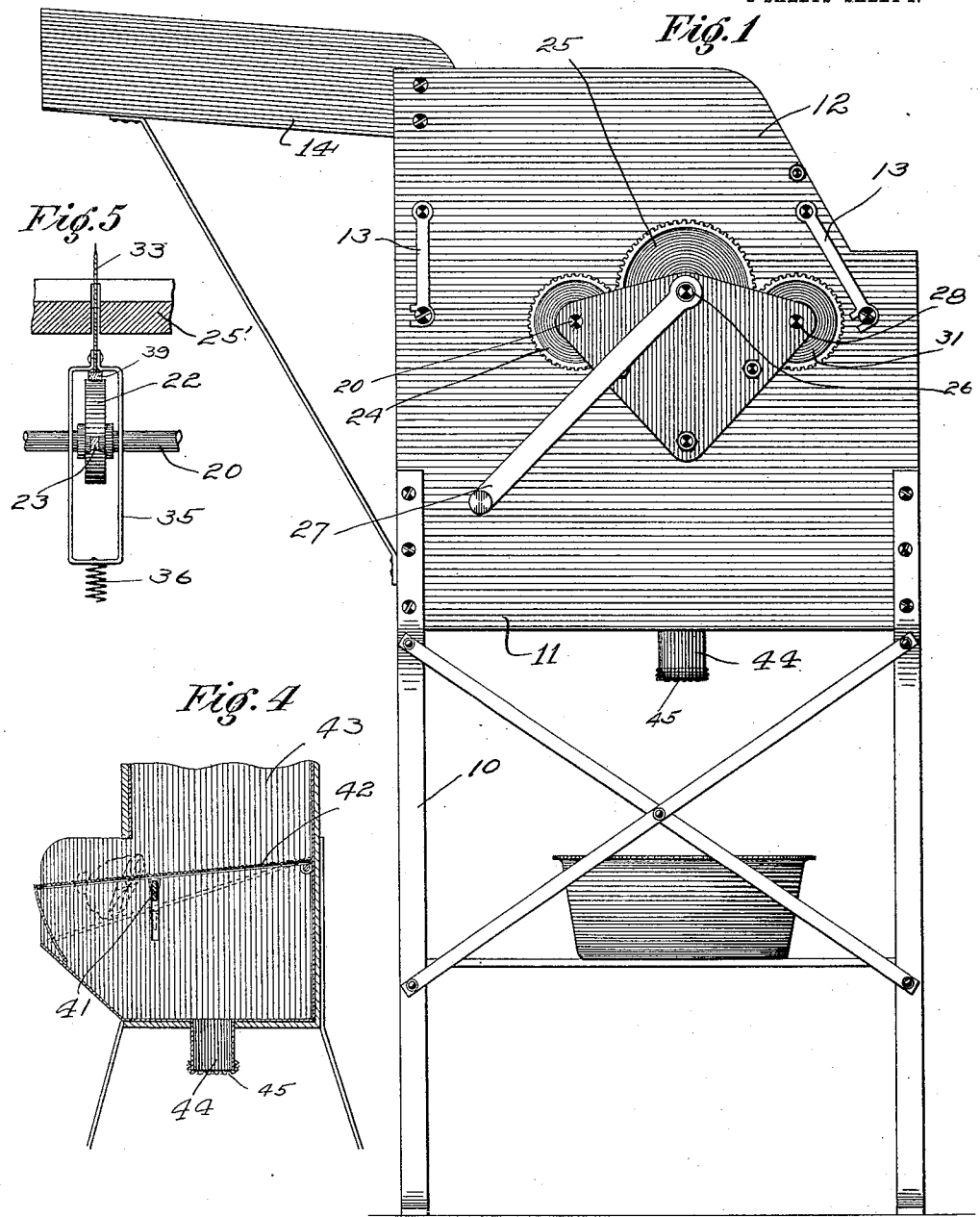
Witnesses
Frank H. Carter
W. A. Stock
Inventor
James Smith
By Harry C. Schroeder
Attorney J. SMITH.
FRUIT PRESS.
APPLICATION FILED NOV. 7, 1912.
1,077,437.
Patented Nov. 4, 1913.
2 SHEETS—SHEET 2.
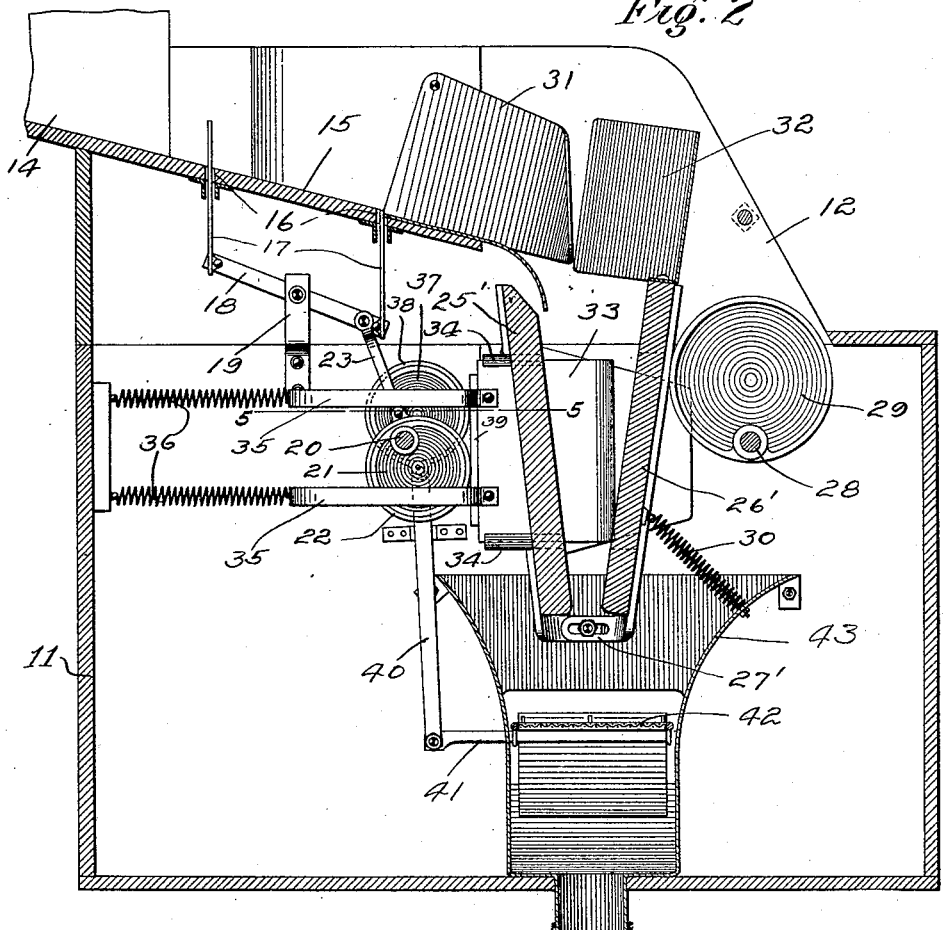
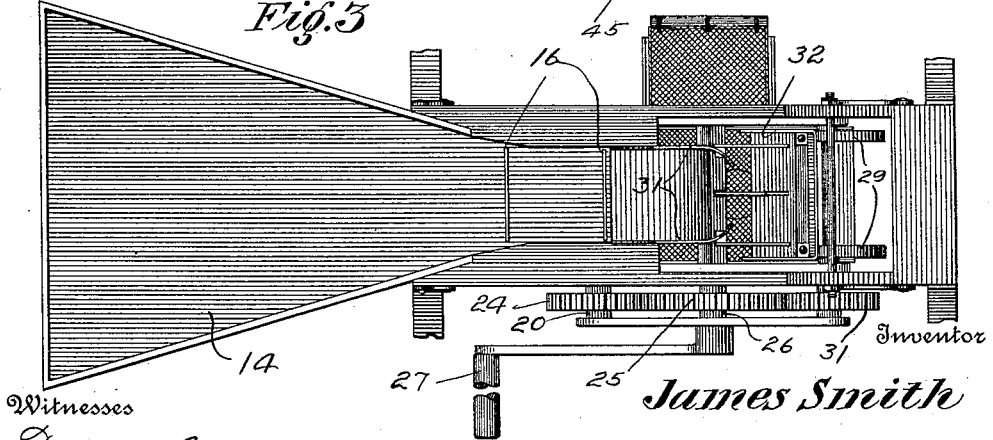
Witnesses
Frank H. Carter
H. A. Stock
Inventor
James Smith
By Harry C. Schroeder
Attorney

UNITED STATES PATENT OFFICE.

JAMES SMITH, OF OAKLAND, CALIFORNIA.

FRUIT-PRESS.

1,077,437.   Specification of Letters Patent.   Patented Nov. 4, 1913.

Application filed November 7, 1912. Serial No. 730,078.

*To all whom it may concern:*

Be it known that I, JAMES SMITH, a citizen of the United States, residing at Oakland, in the county of Alameda and State of California, have invented certain new and useful Improvements in Fruit-Presses, of which the following is a specification.

This invention relates to presses, and has special reference to a press designed to press the juice from citrus fruits, such as oranges, lemons and the like.

The invention more particularly refers to a press which will automatically press fruits of this character which have been previously cut by the machine.

The principal object is to improve and simplify the general construction of devices of this character.

A second object of the invention is to provide a novel cutting arrangement to be used in connection with presses of this character.

A third object of the invention is to provide a device of this character with means for feeding the fruit singly to the cutting mechanism.

A fourth object of the invention is to provide a novel pressing means for devices of this character.

With the above and other objects in view the invention consists in general of certain novel details of construction and combinations of parts hereinafter described, illustrated in the accompanying drawings, and specifically claimed.

In the accompanying drawings like characters of reference indicate like parts in the several views, and:—

Figure 1 is a side elevation of the device. Fig. 2 is a vertical section therethrough. Fig. 3 is a plan of the device. Fig. 4 is a section through the strainer and juice collector. Fig. 5 is a section on the line 5—5 of Fig. 2.

In the present embodiment of the invention there is provided a stand or frame 10 whereon is mounted a casing 11 having a detachable upper portion 12 secured to the casing by hooks 13. Secured to the detachable portion 12 is a hopper 14 for the reception of the fruit and this hopper communicates with a chute 15 down which the fruit falls, this chute being provided with spaced openings 16 through which reciprocate gates 17 having their lower ends connected to a lever 18, which is pivoted intermediate its ends to a bracket 19 so that as one of these gates is raised the other is lowered. Extending through the casing is a shaft 20 whereon is an eccentric 21 which is surrounded by a strap 22, the latter being connected to one end of the lever 18 by a rod 23. Outside of the casing there is mounted on this shaft 20 a gear 24 which meshes with a gear 25 on the main or drive shaft 26, the latter being provided with an operating crank 27. Now by turning this crank the lever 18 will be caused to oscillate thus alternately raising the gates 17 and allowing the fruit to fall down the chute one at a time.

The press proper consists of a fixed jaw 25' which is secured to the casing and a pivotally mounted jaw 26' which is pivoted to the fixed jaw as at 27' so that it may oscillate to and from this fixed jaw. Extending through the casing is a shaft 28 whereon is mounted a pair of eccentrics 29 which bear against the pivotally mounted jaw, the latter being held firm against the eccentrics by means of the spring 30. This shaft 28 has mounted thereon a gear 31 which meshes with the gear 25 so that all of the parts are driven simultaneously. On the lower end of the chute are certain guide plates 31 and similar co-acting guide plates 32 are carried on the pivotally mounted jaw so that the fruit is guided directly between the two jaws. The fixed jaw 25' is provided with a vertical slot through which extends a knife 33, which is slidably mounted in guides 34. Connected to the rear of the knife are yokes 35, which are normally drawn back by springs 36. The eccentric strap 22 constantly bears against the knife so that the rotation of the shaft 20 causes reciprocation of said knife and the position of the two eccentrics 29 and 21 is such that the fruit is cut prior to the closing of the jaws 25' and 26'. The eccentric strap 22 engages a wearing plate 39 on the knife to prevent wear of the same. On the shaft 20 is also mounted an eccentric 37 having a strap 38, and pending from this strap is a link 40 which is connected to a bar 41 secured to the free end of the pivotally mounted screen 42 arranged within a receiving hopper 43 provided at its lower end with an outlet 44.

In the operation of this device the fruit is placed in the hopper 14 and the crank handle turned. This causes alternate reciprocations of the gates 17 which allows the fruit to feed one at a time in between the pressing jaws. Now by the peculiar cam arrangement the knife advances just after each fruit drops in and cuts the same in two while it is being held firmly by the jaws and the knife is then withdrawn. Following this the cam 29 closes the movable jaw toward the fixed jaw and squeezes the juice from the fruit. Upon the opening of the jaws by further movement of the cam 29 the seeds, pulp and skin are caught on the screen 42, which next moves to an inclined position by the dropping of the free end through the action of the cam 37 thus permitting these waste portions to roll off into any suitable receptacle. Meanwhile the juice flows through the screen 45 on the outlet 44 into another receptacle.

There has thus been provided a simple and efficient device of the kind described and for the purpose specified.

Having thus described the invention what is claimed as new, is:—

1. In a device of the kind described, fruit pressing means, comprising a fixed jaw and oscillating jaw, fruit cutting means including a knife arranged to reciprocate through said fixed jaw, and means to successively operate said knife and said oscillating jaw.

2. In a device of the kind described, fruit pressing means comprising a fixed jaw and an oscillating jaw, a cam for moving said oscillating jaw to and from said fixed jaw, a knife passing through said fixed jaw and reciprocable therethrough, a second cam arranged to reciprocate said knife, and gearing connecting said cams.

3. In a device of the kind described, fruit pressing means including a fixed jaw and an oscillating jaw opposed thereto, an eccentric cam for operating said oscillating jaw, a knife reciprocable through said fixed jaw, an eccentric cam for operating said knife, a feeding chute, spaced gates on said feeding chute, an operative connection between said gates to raise the one as the other is lowered, a shaft on which the second mentioned cam is mounted, an eccentric operatively connected to the gate operating mechanism, gearing connecting said eccentric and cams, the eccentric being mounted on said shaft.

4. In a device of the kind described, fruit pressing means including a fixed jaw and an oscillating jaw opposed thereto, an eccentric cam for operating said oscillating jaw, a knife reciprocable through said fixed jaw, an eccentric cam for operating said knife, a feeding chute, spaced gates on said feeding chute, an operative connection between said gates to raise the one as the other is lowered, a shaft on which the second mentioned cam is mounted, an eccentric operatively connected to the gate operating mechanism, gearing connecting said eccentric and cams, the eccentric being mounted on said shaft, an oscillating screen and an operative connection between the oscillating screen and the second mentioned eccentric cam.

5. In a device of the kind described, fruit pressing means including a fixed jaw and an oscillating jaw opposed thereto, an eccentric cam for operating said oscillating jaw, a knife reciprocable through said fixed jaw, an eccentric cam for operating said knife, a feeding chute, spaced gates on said feeding chute, an operative connection between said gates to raise the one as the other is lowered, a shaft on which the second mentioned cam is mounted, an eccentric operatively connected to the gate operating mechanism, gearing connecting said eccentric and cams, the eccentric being mounted on said shaft, an oscillating screen and an operative connection between the oscillating screen and the second mentioned eccentric cam, and spring means to restore said knife and oscillating jaw to normal position.

In testimony whereof I affix my signature in presence of two witnesses.

JAMES SMITH.

Witnesses:
G. H. WOODSIDE,
M. M. ESCHERICH.

---

Copies of this patent may be obtained for five cents each, by addressing the "Commissioner of Patents, Washington, D. C."